United States Patent [19]
Hirschfeld

[11] 3,822,095
[45] July 2, 1974

[54] SYSTEM FOR DIFFERENTIATING PARTICLES
[75] Inventor: Tomas Hirschfeld, Framingham, Mass.
[73] Assignee: Block Engineering Inc., Cambridge, Mass.
[22] Filed: Aug. 14, 1972
[21] Appl. No.: 280,271

[52] U.S. Cl.............. 356/39, 250/273, 250/274, 356/36, 356/104, 356/204
[51] Int. Cl...................... G01n 21/26, G01n 21/52
[58] Field of Search....... 356/36, 39, 103, 104, 201, 356/204; 424/101; 250/573, 574, 576

[56] References Cited
UNITED STATES PATENTS

| | | | |
|---|---|---|---|
| 3,315,229 | 4/1967 | Smithline | 356/36 |
| 3,327,117 | 6/1967 | Kamentsky | 356/36 |
| 3,662,176 | 5/1972 | Kamentsky et al. | 356/39 |
| 3,686,395 | 8/1972 | Stephan | 424/101 |
| 3,699,336 | 10/1972 | Ehrlich et al. | 356/39 |

OTHER PUBLICATIONS
L. G. Koss, M.D., Diagnostic Cytology and its Histopathologic Bases, 2nd Ed., Lippincott, Philadelphia 1968, Qy4K86d, pp. 624–625.

Primary Examiner—Ronald L. Wibert
Assistant Examiner—F. L. Evans
Attorney, Agent, or Firm—Schiller & Pandiscio

[57] ABSTRACT

A system for differentiating among white blood cells by flowing the latter in a supporting liquid through an elongated sheathed-fluid flowcell in which the supporting liquid and sheath fluid contain additives to adjust the indices of refraction, the viscosity and the osmotic pressure. Radiation is focussed onto each cell in sequence to provide measurements of two different shape-dependent functions of the cellular nucleus, such as the surface area, volume, mean thickness or mean, cross-sectional area. Means are provided for establishing a shape factor based upon a ratio of the two measurements normalized to eliminate size dependent variables. The derivation of the shape factor from an idealized standard factor is then indicative of the classification of the cell.

26 Claims, 4 Drawing Figures

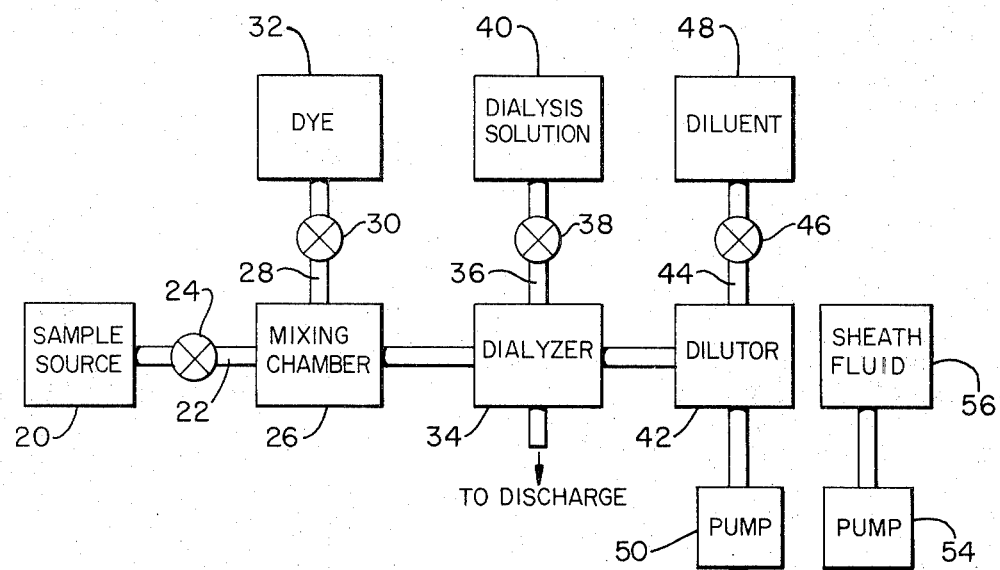
FIG. 1
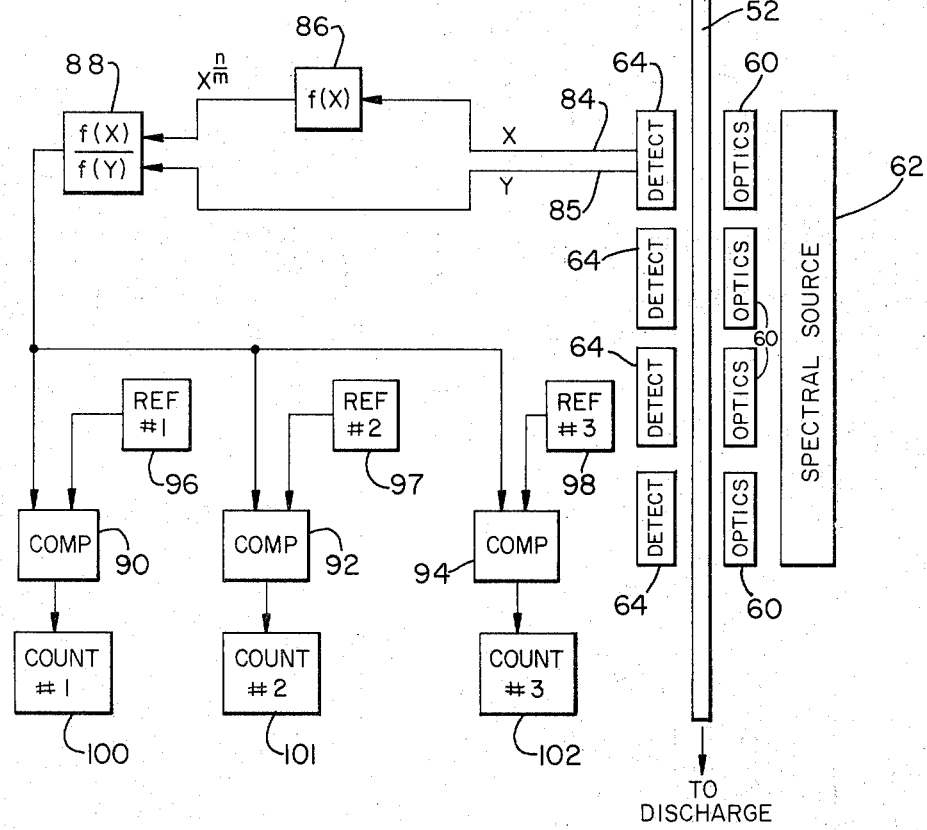

SYSTEM FOR DIFFERENTIATING PARTICLES

This invention relates to pattern recognition and more particularly to apparatus for and methods of determining the classification of blood cells.

The classification by a pathologist of a population of blood cells is usually based upon five visual parameters determined microscopically: the color, size and shape of the cell nucleus after appropriate staining, and the color and size of stained cytoplasm. While the technique provides quite good classification, it is usually limited to a population of a few hundred cells. Despite its high degree of redundancy in cell identification, the technique can nevertheless be in serious error, because the limited populations may not provide a statistically reliable sampling.

Considerable efforts have been made to provide apparatus that will automatically recognize the same parameters employed by the pathologists. For example, a number of systems employ electronic image tubes with computers to achieve pattern recognition. However, such systems invariably require a very large number of resolution elements with a commensurately sized computer memory, and are therefore usually very expensive and often bulky and complex.

A number of automatic blood classification systems use non-imaging techniques in which the classification methods are based typically on size only or on color only. However, in such devices, the random orientation of cells leads to severe difficulties in size measurement by radiometry or imaging, and thus tends to introduce serious inaccuracies in cell classification. One system has attempted to obviate some of these problems by using staining techniques which are highly selective to the enzymes of particular types of cells, but it requires both the use of live cells which are both genetically and metabolically normal. This technique must therefore miss some interesting, diagnostically significant cells with abnormal pathology. Further, this enzyme-stain technique has a nondirect relation to standard methods and therefore may not be acceptable to many pathologists.

Differential counting of the various corpuscular components of blood by automatic methods has heretofore been encumbered by a number of other difficulties. For example, the several catagories, into which white corpuscles are normally classified are to some extent arbitrary, in that many cell characteristics vary in a continuum. Considerable judgment is thus needed to classify some borderline cells. These classifications often become less definite in case of disease, precisely when exact analysis is most likely to be required. Furthermore, many diseases may lead to the appearance of a variety of unusual types of corpuscles, creating a picture whose complexity seems to demand intervention of a human operator in the classification process.

If unfractionated blood is used, very large numbers of particles must be counted in order to count the rarer blood corpuscles with some accuracy. If fractionation is used, the reliability of the procedure, both in rejection of the particles discriminated against and in recovery of those selected, will not be total. This becomes even more severe in pathological conditions.

A principal object of the present invention is therefore to provide a novel system for classifying a number of blood cells. Another object of the invention is to provide a non-imaging measurement of cell parameters, compatible with standard hematological practice. Yet another object of the present invention is to provide such a non-imaging measurement of blood cell parameters wherein data is preprocessed so that the use of large computers is avoided.

Yet other objects of the present invention are to provide such a measurement system which can be employed with blood cells moving in a flow stream; to provide such a system wherein measurements are made with minimized orientation-caused error; to provide such a system wherein a shape factor of a cell or cell nucleus is determined from simultaneous measurement of the magnitudes of two different functions of shape; to provide such a system wherein the shape factor is determined from simultaneous measurement of magnitudes related respectively to the volume of the nucleus and the surface area of the nucleus; and to provide such a system wherein the shape factor is determined from simultaneous measurement of magnitudes related respectively to the effective thickness and the volume of the cell nucleus.

Yet other objects of the invention will in part be obvious and will in part appear hereinafter. The invention accordingly comprises the apparatus possessing the construction, combination of elements and arrangement of parts, and the method comprising the several steps and relation of one or more of such steps with respect to each of the others, all of which are exemplified in the following detailed disclosure, and the scope of the application of which will be indicated in the claims.

For a fuller understanding of the nature and objects of the present invention, reference should be had to the following detailed description taken in connection with the accompanying drawings wherein like numerals denote like parts, and wherein;

FIG. 1 is a schematic block diagram illustrating application of the invention to a system for obtaining a differential count among selected types of blood cells;

Figure 2:
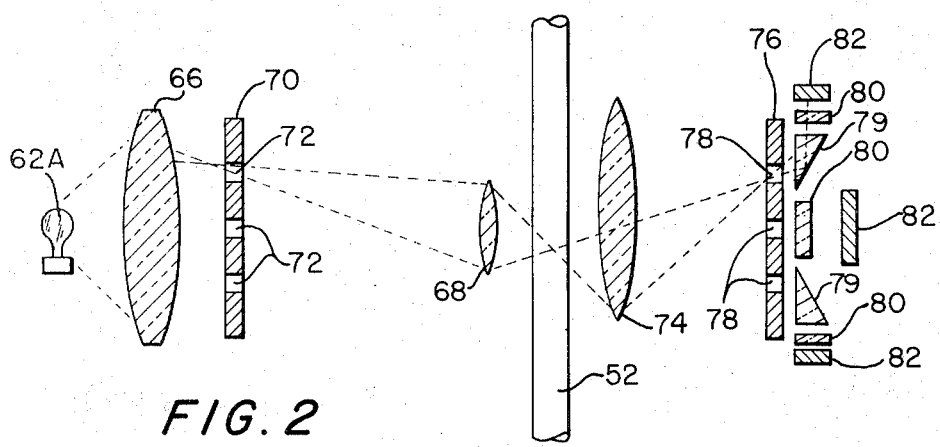
FIG. 2 is a schematic diagram showing an exemplary optical system useful in part of the system of FIG. 1.

The system of the invention herein disclosed is compatible with standard hematology laboratory practice, and does not require cell fractionation or selective lysis, and requires few solutions. The sample is not destroyed, and is available for subsequent microscopic examination or other diagnostic tests. Most importantly, the present invention permits the direct assignment of cells to the major cell fractions. This reduces error, since no counts are derived as a remainder when two other counts are differenced, as for example, in a scheme which characterizes monocytes as being non-granulocytes which are also non-lymphocytes.

The term "function" as used herein is intended to be interpreted in the mathematical sense to mean a variable, the value or magnitude of which is determined by a second variable. The term "different functions" is intended then to mean a plurality of functions wherein the laws of dependence on the second variables are different.

The present invention generally is a system comprising means for substantially simultaneously measuring the magnitudes of two different shape-dependent functions of the cell or its nucleus and means for determining a relationship between the magnitudes. For example, the property of sphericity can be considered to be the desired shape factor. For a perfect sphere, there are a number of different shape dependent functions, typically the surface area (A), the volume (V), the mean cross-sectional area (X) and the mean thickness (T). These latter can be defined respectively as $$A = \pi d^2 \quad \quad 1.$$
$$V = \pi d^3/6 \quad \quad 2.$$
$$X = \pi(d/2)^2 \quad \quad 3.$$
$$T = \pi(\tfrac{2}{3})d \quad \quad 4.$$

where $d$ is the spherical diameter.

The relationship between any two of these shape dependent functions can be expressed by a ratio $$[f(d)]^n / [\phi(d)]^m = \gamma$$

where $n$ and $m$ are exponents selected so that $d$, which is size dependent primarily, vanishes. Thus, for example, if $f(d)$ is V, $\phi(d)$ is A, $m = 1$ and $n = \tfrac{2}{3}$, the shape factor $\gamma$ for a cellular nucleus having a perfectly spherical shape will be a readily computed limit quite independent of the value of d. Any departures measured from such limit are measures of variation of the shape of the nucleus from sphericity and hence a determination of an aspect of shape. It will readily be seen that, for example, where $f(d)$ is V and $\phi(d)$ is T, by selecting $m = 1$ and $n = \tfrac{1}{3}$, the shape factor $\gamma$ will again have a readily computed limit representing a sphere, and will vary according to departures from sphericity.

In one embodiment of the present invention means are provided for deriving a magnitude which is proportional to the volume of a cell nucleus, preferably by measuring fluorescent re-emission of light absorbed by the nuclear DNA, and simultaneously deriving a magnitude related to the nuclear surface area, preferably by measuring the light scattering from the nucleus. Means are also provided for then determining a shape factor which is proportional to a ratio of the volumetrically related magnitude to the surface related magnitude.

In another embodiment of the invention, the two magnitudes derived are respectively related to other shape-dependent factors, particularly the apparent thickness and the volume of a cell nucleus, and a shape factor is obtained from a ratio of these two functions. Measurement here can be achieved from light absorption or by fluorescent re-emission. The effective thickness is measured by examining the self-shadowing reduction in the measured volume at wavelengths where the particle is optically thick. Such reduction arises from the non-linearity of the transmission-thickness relationship.

Referring now to the drawing, the system of FIG. 1 includes source 20 of a sample of blood cells. Source 20 is connectable through conduit 22 and valve 24 to a mixing chamber 26. The latter also is connectable through conduit 28 and valve 30 to supply 32 of a dye or stain bath. The output of chamber 26 is coupled to an input of dialyzer 34, another input of the latter being connectable through conduit 36 and valve 38 to a reservoir or supply 40 of dialysis solution. One output of dialyzer is for discharge of dialyzed stain, the other output of the dialyzer being connected as one input to dilution chamber 42. Another input to chamber 42 is connectable though conduit 44 and valve 46 to supply 48 of diluent fluid.

The diluent from supply 48 is preferably selected (and metered by valve 46) to provide a number of basic qualities for purposes of this invention. The diluent should, when added in metered proportion to the stained cell suspension from dialyzer 34, provide matching of the indices of refraction of the cell cytoplasm and the mixed fluids; because it is highly desirable to maintain substantially laminar flow through the flowcell at a high rate of flow, the diluent should also be selected so that, when added in metered proportion to the cell suspension, it will adjust the fluid viscosity to permit high speed laminar flow. The diluent also should be selected so that, when added to the cell suspension it will attain an optimum osmotic pressure with respect to the cells to maintain their stability. In some instances, pumps may be provided to yield the high rate of flow through the flow cell. In such case, the diluent may also serve to adjust osmotic pressure and thereby compensate for the high static pressure caused by the pumps.

The fluid output from dilution chamber 42 is connected to pump 50, and the output of the latter in turn is connected preferably to a central injector nozzle 51 of a sheathedstream flow cell 52. The latter typically can be of the design disclosed in *Advances in Automated Analysis*, Technicon International Congress 1970, Volume 1 — Clinical (1971) on pages 454–455 of the article by Alex M. Saunders et al. entitled "A Rapid Automated System for Differentiating and Counting White Blood Cells". The annular space 53 around central injector 51 is connected to the output of second pump 54. The input to the latter is connected to a supply 56 of sheath fluid. Injector 51 and space 53 are disposed at one end of flow cell 52, the remainder of the latter being essentially a tube or other elongated enclosed flow channel having an optically transparent portion.

In operation, in the fluid flow portion of the system thus described, the sample of blood cells suspended in a fluid is first mixed in chamber 26 with a concentrated dye solution (typically a mixture of stabilized quinacrine mustard and Wright's stain) from supply 32. Excess dye is then eliminated by dialysis with fluid from reservoir 40 in dialyzer 34 until concentration of dye in the fluid carrier becomes many times smaller than the dye concentration on a typical cell. The sample is then diluted in chamber 42 with diluent from supply 48 to provide adequate separation between blood cells in flow cell 52. It is possible that the dilution alone may be adequate to reduce the solution concentration of dye, in which case the dialyzer may be eliminated. It is desirable to eliminate the dialyzer, as it accounts for a major portion of the total time required for measuring the parameters of a sample (the time between samples can, of course, be much smaller than the time required per sample).

The diluted sample is next pumped by pump 50 through injector 51 into the measuring flowcell 52. The sample stream is confined by a fluid sheath provided by pump 54 of liquid from supply 56 in order to obtain a narrow, rapidly flowing sample stream.

As noted, flow cell 52 is constructed so that fluid is introduced in one stream through injector nozzle 51 and in an annular stream, surrounding the first stream, by pump 54 into annular space 53. The velocities of the central sample stream and the annular or sheath stream are controlled such that laminar flow conditions are established at the junction of the two streams, hence the two streams will move together with the sheath stream effectively constricting the sample stream. The sheath fluid provided from source or supply 56 preferably is selected to provide the requisite viscosity which will permit laminar flow under the head pressure provided by pump 54. It should also be selected so that there is close matching of refractive indices between the sheath and sample fluids.

The diluent from supply 48 and the sheathfluid 56 may be the same if desired although the requirements for the two need not be identical. For example, it is desirable to control carefully the refractive index and/or viscosity of both of the fluids, as well as the osmotic pressure produced across the surface of sample cells which may be suspended in or associated with the fluids. To these ends, the fluids are preferably aqueous solutions containing both additives which are polymeric and additives which are salts. The control of refractive index is established by adjusting the concentration of the polymer in the solution. For a given concentration of polymer, the viscosity of the fluid can be adjusted by selecting an appropriate degree of polymerization (i.e. the average molecular weight of the polymer) which parameter has relatively little effect on refractive index. Lastly, the polymer will have little effect on osmotic pressure, so the fluid may include a complementary dissolved salt, the concentration of which will serve to adjust the osmotic pressure to some desired value.

Thus typical polymeric additives for use in the diluent and sheath fluids are polyethylene glycol and the like, and blood plasma extenders such as dextran, polyvinyl pyrrolidone and the like. Obviously the salt additive is usually and preferably simply NaCl.

The flow cell preferably has circular cross section and has the largest diameter adjacent the tip of injector nozzle 51, being tapered down stream from that point. To obtain a desirable center sample stream of 20 microns in diameter, typically, the flow cell will be tapered down to an internal diameter of about 200 microns. By using such a flow cell the blood cells are transmitted along the central stream in single file, at high speeds.

The flow cell thus described then essentially confines the blood cells to a narrow stream wherein the blood cells move each through a particular point substantially one at a time and therefore each can be examined in sequence. Further because the center stream confines the blood cells to a substantially axial flow, the latter motion of the blood cells is sharply limited and hence the cells will remain well within focus of an optical system. Thus the system of the invention includes an electro-optical subsystem which is shown schematically in FIG. 1. The subsystem preferably includes one or more optical devices 60 such as lenses, mirrors and the like for illuminating separate portions of flow cell 52 with radiation from one or more sources, shown generically as spectral source 62. Typically associated with each optical device 60 is a detection device 64 for converting selected parameters of radiation from a corresponding device 60 into an electrical signal.

For simplicity in exposition only one detection device 64 is shown in FIG. 1 as electrically connected to other equipment. A typical detection device as shown in FIG. 2 includes radiation source 62A and an optical system, essentially an inverted microscope having "eyepiece" lens 66 disposed adjacent source 62A and objective lens 68 disposed adjacent one side of flow cell 52. Positioned intermediate lenses 66 and 68 is a mask 70 having a plurality of apertures such as slots 72 therein. The microscope formed of lenses 66 and 68 is so positioned that radiation from source 62A, formed into a plurality of discrete apparent sources by lens 66 and mask 70 is focused by objective lens 68 at a like plurality of spots distributed axially substantially along the center of the center stream in flow cell 52.

Disposed on the opposite side of flow cell 52 and typically on the common optic axis of lenses 66 and 68 is another lens 74, typically a microscope type objective which has an equal or higher numerical aperture than lens 68, and therefore is capable of accepting all of the radiation transmitted through lens 68 from source 62A. Disposed between lens 74 and its focal plane is apertured diaphragm 76. Apertures 78 in the latter are disposed such that light originating from each aperture 72 in mask 70 is substantially focused through a corresponding aperture 78 in diaphragm 76. Disposed on the opposite side of each aperture 78 from lens 74 are optical deflectors, such as mirrors or prisms 79, for diverting the light from each aperture 78 at a corresponding different angle or direction to the common optical axis of lenses 66, 68 and 74. The system of FIG. 2 may also include a plurality of filters 80 each positioned in the path of light diverted by a respective one of prisms 79. Filters 80 may be selected, for example, to view only particular wavelengths as desired. Positioned to detect the radiation transmitted by each of filters 80 are corresponding ones of detectors 82. The latter typically can be photodiodes with extremely fast rise times, or photocells of other known types.

In the optical system as described, typically the source can be means for providing a specified spectrum, such as a xenon high intensity lamp, with or without a selected output filter. It is quite important to set up a number of images (corresponding to the number of apertures 72 in mask 70) and that these images be rather close to one another axially along the center of flow cell 52. This structure serves to minimize the time for a single cell to go from one image or lightspot to the next and to activate corresponding detectors 82, thereby serving to minimize consequences of the errors in the velocity of the cells traversing flow cell 52. This minimization of velocity error is particularly important in instances where it is desired to correlate successive readings of the same cell so as to characterize the cell according to several different measurements.

Figure 3:
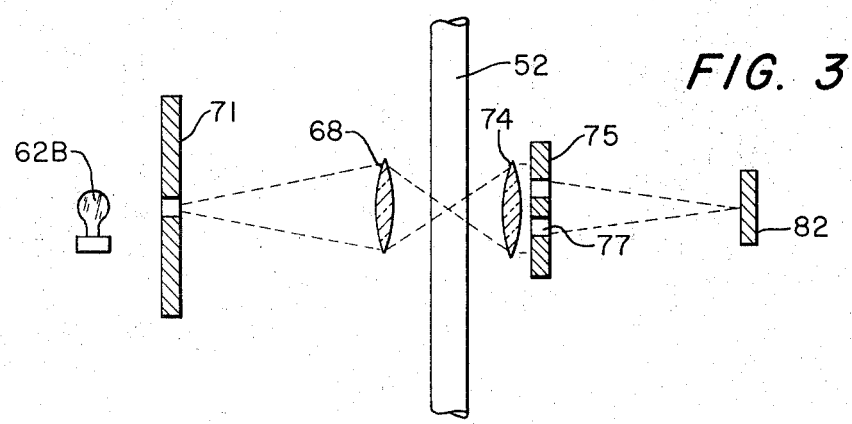
FIG. 3 is a schematic diagram showing another exemplary optical system useful in connection with the system of FIG. 1.

It will also be appreciated that the structure described in FIG. 2 is particularly useful in determining either absorption or transmission characteristics of a blood cell. To measure scattering, a typical system is shown in FIG. 3 as including source 62B, apertured mask 71 and lens 68. These elements are positioned to focus the radiation from the aperture in mask 71 as a spot centered within flow cell 52. The system of FIG. 3 also includes lens 74, screen 75 and detector 82. Screen 75 is simply an opaque screen with an annular opening 77 therein. Opening 77 of course surrounds an opaque center. As well known in the art, lens 74, screen 75 and detector 82 are so positioned with respect to one another and to flow cell 52, that light scattered from a particle in flow cell 52 over some given range of angles will be detected by detector 82.

Referring again to FIG. 1, it will be seen that typically, there are at least two output lines 84 and 85 from respective detectors 82 in a detection device 64. The signal transmitted on line 84 is designated as "X". Similarly the signal being transmitted on line 85 is designated as "Y". It can be assumed that the signals X and Y each represent a different shape-dependent function of a particular cell occasioned by an appropriate selection of input radiation to the cell, the selected output radiation from the cell, the position of the input radiation to the cell and the position of the detector and detector optics with respect to the output radiation from the cell. Line 84 is coupled to provide the signal X to the input of function element 86 which is capable of generating from signal X an output signal which is an exponential in the form $X^{n/m}$ where $n$ and $m$ are values selected according to the type of shape-dependent functions that X and Y may respectively be. Function element 86 may be any of a number of known types of electronic elements. For example, such an element may be a diode function generator the output current of which is an arbitrary function of an input voltage. Such diode function generators are commercially available as Model SPFX-N/P circuits currently sold by Teledyne Philbrick/Nexus, Dedham, Massachusetts and described in Teledyne Philbrick/Nexus Bulletin EEM, File No. 1100.

The output of function element 86 is connected to one input of a ratiometric device 88, another input of device 88 being connected to line 85. Obviously, if line 85 provides a voltage and the output of element 86 is a current, appropriate voltage/current conversion equipment should be introduced in at least one of the lines so that the two inputs to ratiometric device 88 are similar parameters. Ratiometric device 88 is a well-known device capable of accepting a pair of different inputs and for providing an output which is a ratio of those inputs. The output of ratiometer 88 is typically in a form $f(X')/f(Y)$ where $X'$ is $X^{n/m}$. It will be appreciated that the output of the ratiometer is therefore some shape factor for the particle. Obviously, and strictly speaking, the two inputs to ratiometer 88 will often not be simultaneous if the corresponding detectors are triggered in sequence. Hence, the two inputs should be time correlated, as by introducing a delay line into line 84 or by employing known sample-and-hold techniques. Such refinements have been omitted from the drawings for the sake of simplicity in exposition and because such expedients are so well known in the art.

In order to employ the shape factor or output signal from ratiometric device 88 for classifying blood cells, a typical circuit is shown in FIG. 1 wherein the output from ratiometric device 88 is connected in parallel to respective first inputs of a group of comparators 90, 92 and 94. Each such comparator includes a second input which is connected to a respective corresponding source, 96, 97 and 98 of reference signals. The output of comparators 90, 92 and 94 are respectively connected to counters 100, 101 and 102. Comparators 90, 92 and 94 are of the type known as threshholding comparators for providing an output pulse only when the input signal is greater than (or less than as the case may be) the amplitude of the reference signal provided from a corresponding reference source. Such comparators are also well known in the art and need not further be described here.

In operation of the electro-optical system as heretofore described, the shape factor $\gamma$ is derived as the ratio of any two of a number of different shape dependent functions. Hence, as a blood cell traverses flow cell 52, at least two shape dependent functions of that cell are then measured.

Figure 4:
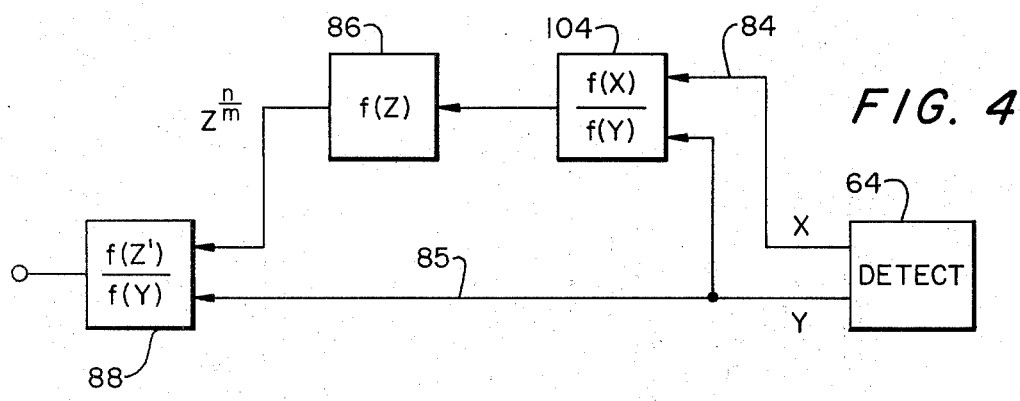
FIG. 4 is a schematic diagram of an electrical circuit which is a modification of a portion of the system of FIG. 1 for an alternative structure.

For example, one can select as the two desired shape dependent functions, the mean effective thickness of the nucleus of the cell and the nuclear volume. To determine the value of these functions, one then need simply measure light absorption by nucleic acid in two selected wavelength regions. For one of these regions (c.a. 2 80m $\mu$ for DNA) the nuclei of white blood cells are usually optically dense, while for some other wavelengths, the nuclei are optically thin. These wavelength regions can be selected by corresponding choices of filters 80 and the spectral output of source 62A of FIG. 2. Self-shadowing will therefore make the ratio of these two measurements a non-linear, thickness-dependent value. This ratio of measurement provides a measure of optical depth and therefore of the mean effective thickness of the nucleus. In such case, the circuit of FIG. 1 should be modified as shown in FIG. 4 to provide ratiometric circuit 104 connected to lines 84 and 85 for determining the ratio of X/Y. The output of ratiometric circuit 104 is then connected as the input to function element 86. The output of element 86 can be considered as $f(Z)$ or $Z^{n/m}$; the output of ratiometric circuit can be considered as the term $f(X)/f(Y)$. Hence the output of ratiometric device 88 will be $f(Z')/f(Y)$ where $Z' = Z^{n/m}$. The measurement done in the wavelength region where the nucleus is optically thin provides the signal Y which is proportional to the nuclear volume. This latter measurement is correlated in device 88 as heretofore described with the thickness data from function element 86 to give a shape describing factor.

Measurements for an optically thick absorber are usually orientation dependent. In order to avoid orientation effects the illumination provided by lens 68 should be at a very high aperture (e.g. >90°) ideally providing an illuminating cone approaching a 180° aperture. This can be achieved by using immersion techniques whereby the interspace between the objective lens and the wall of the flow cell is filled with fluid having a very high index of refraction. Cones in excess of 160° can be formed in this manner. For a wide angle illuminating cone of uniform radiance, the interaction between an absorber of arbitrary shape and the incoming radiation approaches orientation invariancy. This occurs because regardless of the absorber's position, the amount of light coming at it from a given relative angle of approach is always the same. Should the absorber rotate, a given angle of incidence contains different rays, but the total intensity of the bundle of rays should be constant.

Alternatively, one can instead measure the nuclear volume and the nuclear surface and correlate these measurements to obtain a shape factor. The nuclear volume, as noted, is best determined photometrically through measurements of its DNA content. In addition to measuring by direct absorption of radiation in a region where the nucleus is optically thin, the nuclear volume may also be determined by measuring the fluorescent reemission of the absorbed light. This may be preferably in some cases because to obtain good signal-to-noise ratio in absorption measurements a substantial fraction of the light must be absorbed. For fluorescent measurements, on the other hand, the same signal-to-noise ratio can be obtained with much smaller signals. Given a good conversion efficiency between absorption and subsequent fluorescent emission, substantially less absorption is needed in fluorescence measurements. Low absorption is desirable since it reduces the effect of self-shadowing of one portion of the nucleus by another, which tends to distort the relationship between measurements and the total DNA content. Fluorescent measurements also tend to be less orientation sensitive with respect to non-spherical nuclei.

The surface related magnitude can be measured in terms of light scattering from the molecular structure of the nucleus where the particles are in the order of a few wavelengths in size. Because the extent of scattering produced per unit particle volume increases as the particle becomes smaller an assemblage of small particles will scatter more light than a single particle of the same body. However, in such case spurious scattering must be eliminated. Such spurious scattering usually arises from three sources: (1) scattering from the blood cell cytoplasm which may be eliminated by matching the index of refraction of the fluid carrying the blood cell to the cytoplasm by the techniques heretofore described; (2) scattering from the blood cell membrane which is particularly strong for fairly thick membranes such as are found in erythrocytes; and (3) colloid scattering from the whole cell and surrounding solvent. Scattering from erythrocytes can be eliminated by providing a detector 64 which will detect hemoglobin, and by using the output of such detector to gate out any signals arising from erythrocytes. Colloid scattering is very strongly concentrated in the forward direction and thus the provision of detector optics of the type to avoid detecting wholly forward scattered light will serve to minimize the effect of colloid scattering.

It is appreciated that the scattering behavior of small particles of arbitrary shape and size in the order of a few wavelengths is exceedingly complex. However, the shape dependent factor sought has no particular linear or accuracy requirement, so that as long as scattering efficiency grows for smaller particles, one can differentiate between a large particle of given volume and an assemblage of smaller particles having the same total volume. Therefore, the only requirement for the size-depenent function based on scattering is that it have a slope which does not change in sign. Particularly when using scattering techniques for establishing a shape dependent factor, it is important to employ a broadband source, i.e. a source which provides radiation covering at least one octave of wavelengths at amplitudes above some minimum level. Of course the detector employed should be also responsive substantially across the bandwidth of the source. By employing such a broadband source and broadband detector one achieves smoothing of the scattering function preferably a curve with substantially invariant sign of its slope.

Once the two functions, X and Y, (or Z and Y as the case may be) are obtained, normalized by function element 86 and ratioed by 88, a nuclear shape factor can be determined for each white blood cell traversing flow cell 52. By comparing the magnitude (in comparators 99, 92 and 94) of each such factor against a corresponding different reference magnitude from a corresponding reference source, one then can arbitrarily count those shape factors which for example represent "very spherical", "very unspherical" and "medium sphericity" as an example of an arbitrary classification scheme. Such classification is of course not limited necessarily to any number of classes. Indeed, the outputs of the comparators need not be directly counted but can be gated to counters according to correlation with yet other aspects of the blood cells as may be determined for example by yet other detector devices 64.

Since certain changes may be made in the foregoing method and apparatus withough departing from the scope of the invention therein involved, it is intended that all matter contained in the above description and shown in the accompanying drawings be construed in an illustrative and not in a limiting sense.

What is claimed is:

1. Method of determining the comparative shape of a cellular body referred to a sphere, and comprising the steps of;

measuring the magnitude of a first shape-dependent function of said body by directing a beam of radiation at said body and measuring the magnitude of radiation consequently emitted from said body;

measuring the magnitude of a different shape-dependent function of said body other than said first shape-dependent function by directing a beam of radiation at said body and measuring the magnitude of radiation consequently emitted by said body, determining the value of a relationship between the magnitudes of said first and different shape-dependent functions; and comparing said value to a predetermined value of said relationship between the magnitudes of said first and different functions with respect to said sphere.

2. Method as defined in claim 1 wherein said relationship is a ratio of said first function to said different function, said first and different functions being respectively raised to the powers $m$ and $n$, $m$ and $n$ being values selected so that terms in said functions which are dependent upon body size are minimized.

3. Method as defined in claim 1 wherein said steps of measuring are carried out substantially simultaneously.

4. Method as defined in claim 1 wherein one of said functions is proportional to the volume of said body and said step of measuring said magnitude of said one of said functions comprises illuminating said body with radiation of a wavelength band to which said body is optically thin and measuring the absorption of said wavelength band.

5. Method as defined in claim 1 wherein one of said functions is proportional to the volume of said body and said step of measuring said magnitude of said one of said functions comprises illuminating said body with radiations of a wavelength band to which said body is optically thin and measuring fluorescent emission from said body caused by absorption of said wavelength band.

6. Method as defined in claim 1 wherein one of said functions is proportional to the thickness of said body and wherein said step of measuring said magnitude of said one of said functions comprises illuminating said body with radiation of a first wavelength band to which said body is optically dense, and measuring the absorption of said first wavelength band;

and further comprises illuminating said body with radiation of a second wavelength band to which said particle is optically thin and measuring the absorption of said second wavelength band;

establishing a ratio of the measurements of absorption in said first and second wavelength bands thereby to derive a value dependent on the thickness of said body.

7. Method as defined in claim 1 wherein said first shape-dependent function is dependent upon the surface area of said body and said different shape-dependent function is dependent upon the thickness of said body.

8. Method as defined in claim 1 wherein said first shape-dependent function is dependent upon the thickness of said body and said different shape-dependent function is dependent upon the volume of said body.

9. Method as defined in claim 1 wherein said first shape-dependent function is dependent upon the surface area of said body and said different shape-dependent function is dependent upon the cross sectional area of said body.

10. Method as defined in claim 1 wherein said first shape-dependent function is dependent upon the surface area of said body and said different shape-dependent function is dependent upon the volume of said body.

11. Method as defined in claim 1 wherein said first shape-dependent function is dependent upon the mean cross-sectional area of said body and said different shape-dependent function is dependent upon the volume of said body.

12. Method as defined in claim 1 wherein said first shape-dependent function is dependent upon the mean cross-sectional area of said body and said different shape-dependent function is dependent upon the thickness of said body.

13. Apparatus for determining the comparative shape of a cellular body referred to a sphere, and comprising in combination;

first means for directing a beam of radiation at said body and for measuring the magnitude of radiation consequently emitted by said body so as to produce a first signal dependent upon a first shape-dependent function of said body;

second means for directing a beam of radiation at said body and for measuring the magnitude of radiation consequently emitted by said body so as to produce a second signal dependent upon a different shape-dependent function of said body;

means for establishing a value of a relationship between said first and second signals, and means for comparing said value to a predetermined value of said relationship between the magnitudes of said first and different functions for said sphere.

14. Apparatus as defined in claim 13 wherein means for establishing said relationship between said first and second signals comprises means for raising the amplitudes of said first and second signals to respective powers of $m$ and $n$, $m$ and $n$ being values selected so that terms in said functions which are dependent upon body size are minimized, and means for determining a ratio of said raised signals.

15. Apparatus as defined in claim 13 wherein said first and second means are operative to produce said signals substantially simultaneously.

16. Apparatus as defined in claim 13 wherein said first means comprises;

means for illuminating said body with radiation of a wavelength band to which said body is optically thin and means for producing a signal dependent upon the amount of the absorption of said radiation by said body.

17. Apparatus as defined in claim 13 wherein said first means comprises;

means for illuminating said body with radiation of a wavelength band to which said body is optically thin; and means for producing a signal dependent upon the amount of fluorescent emission from said body caused by absorption of said wavelength band by said body.

18. Apparatus as defined in claim 13 wherein said first means comprises;

means for illuminating said body with radiation of a first wavelength band to which said body is optically dense;

means for measuring the absorption by said body of said first wavelength band;

means for illuminating said body with radiation of a second wavelength band to which said body is optically thin;

means for measuring the absorption by said body of said second wavelength band;

means for establishing a ratio of the measurements of absorption in said first and second wavelength bands so as to derive a signal dependent on the thickness of said body.

19. Apparatus as defined in claim 18 wherein said second means comprises;

means for illuminating said body with radiation of a third wavelength band to which said body is optically thin, and means for producing a signal dependent upon the amount of either absorption by said body of said third wavelength band or fluorescent emission from said body caused by absorption of said third wavelength band by said body.

20. Apparatus as defined in claim 13 wherein said first means for producing said first signal comprises means for illuminating said body with said radiation in a predetermined wavelength band and means for producing a signal dependent upon the extent of the scattering of said radiation by said body.

21. Apparatus as defined in claim 20 wherein said predetermined wavelength band extends over at least one octave and wherein said means for measuring comprises detection means responsive to said radiation over at least said octave.

22. In apparatus for determining parameters of a blood cell suspended in a first fluid, said apparatus including an elongated flowcell having a first inlet for introducing a stream of said first fluid axially along said flowcell, a second inlet for introducing a stream of a second fluid as an annular sheath in said flowcell around said stream of said first fluid, means for pumping said fluids through said flowcell and means for illuminating at least one portion of said flowcell with radiation of a predetermined wavelength band, the improvement wherein said fluids have a viscosity high enough to permit laminar flow through said flowcell under the pressure head provided by said means for pumping.

23. The improvement as defined in claim 22 wherein said fluids are further selected to reduce the osmotic pressure produced across the surface of said blood cell.

24. The improvement as defined in claim 23 wherein said fluids are further selected to match their refractive indices to one another with respect to said wavelength band and substantially matched to the index of the cytoplasm of said blood cell.

25. The improvement as defined in claim 24 wherein said fluid includes an aqueous solution containing at least a high molecular weight polymer and a dissociated salt.

26. The improvement as defined in claim 25 wherein said polymer is selected from the group consisting of polyethylene glycol, dextran and polyvinyl pyrolidone.

* * * * *